US009937513B2

(12) United States Patent
Kah, III

(10) Patent No.: US 9,937,513 B2
(45) Date of Patent: Apr. 10, 2018

(54) SPRINKLER HEAD NOZZLE ASSEMBLY WITH ADJUSTABLE ARC, FLOW RATE AND STREAM ANGLE

(71) Applicant: Carl L. C. Kah, III, Riviera Beach, FL (US)

(72) Inventor: Carl L. C. Kah, III, Riviera Beach, FL (US)

( * ) Notice: Subject to any disclaimer, the term of this patent is extended or adjusted under 35 U.S.C. 154(b) by 148 days.

(21) Appl. No.: 14/668,431

(22) Filed: Mar. 25, 2015

(65) Prior Publication Data

US 2016/0279657 A1 Sep. 29, 2016

(51) Int. Cl.

| | |
|---|---|
| ***B05B 3/00*** | (2006.01) |
| ***B05B 15/10*** | (2006.01) |
| ***A01G 25/00*** | (2006.01) |
| ***B05B 1/30*** | (2006.01) |
| ***B05B 9/03*** | (2006.01) |
| ***B05B 1/26*** | (2006.01) |

(52) U.S. Cl.

CPC .............. *B05B 15/10* (2013.01); *A01G 25/00* (2013.01); *B05B 1/267* (2013.01); *B05B 1/30* (2013.01); *B05B 1/3026* (2013.01); *B05B 9/03* (2013.01)

(58) Field of Classification Search

CPC B05B 15/10; B05B 1/267; B05B 1/30; B05B 1/3026; B05B 9/03; A01G 25/00

USPC ....... 239/203–206, 231, 232, 237, 240, 569, 239/580, 581.1, 590, 590.5

See application file for complete search history.

(56) References Cited

U.S. PATENT DOCUMENTS

| | | | | |
|---|---|---|---|---|
| 8,636,233 | B2 | 1/2014 | Clark et al. | |
| 8,857,742 | B2 * | 10/2014 | Onofrio | B05B 1/3013 239/240 |
| 9,156,043 | B2 * | 10/2015 | Walker | B05B 1/326 |
| 2003/0155433 | A1 | 8/2003 | Gregory | |
| 2008/0257982 | A1 | 10/2008 | Kah et al. | |
| 2009/0173804 | A1 | 7/2009 | Kah et al. | |
| 2011/0036933 | A1 | 2/2011 | Kah et al. | |

OTHER PUBLICATIONS

International Search Report and Written Opinion dated Oct. 21, 2015 issued in related PCT International Application No. PCT/US15/024646.

* cited by examiner

*Primary Examiner* — Steven J Ganey

(74) *Attorney, Agent, or Firm* — Amster, Rothstein & Ebenstein, LLP

(57) ABSTRACT

A rotary driven sprinkler with adjustable flow rate and distance control where the change in distance of the coverage outwardly from the sprinkler is directly proportional to the change in flow rate. The flow rate at a selected sprinkler design pressure and installed nozzle may be indicated on the top of the sprinkler nozzle housing and its distance of coverage may be set. Also a changeable nozzle with a settable stream elevation angle may be provided using the nozzle retention screw.

24 Claims, 12 Drawing Sheets

SPRINKLER HEAD NOZZLE ASSEMBLY WITH ADJUSTABLE ARC, FLOW RATE AND STREAM ANGLE

BACKGROUND

Field

The present disclosure relates to a nozzle housing assembly including arc adjustment, flow rate adjustment and stream angle adjustment. Specifically, the nozzle housing assembly includes a flow throttling and shut off valve mounted therein and allows for arc adjustment, flow control, and stream angle adjustment from the top of the nozzle housing assembly. The present disclosure further relates to a sprinkler including such a nozzle housing assembly.

Description of the Art

In order to achieve suitable irrigation on irregularly shaped areas of land or near the borders of a land parcel, it is often desirable to change the distribution profile or configuration of a sprinkler to adjust the coverage range, distribution angle, etc. Various types of sprinklers have been introduced to address this need. Applicant's issued U.S. Pat. No. 8,136,743 provides a discussion of these various sprinklers and the entire disclosure thereof is hereby incorporated by reference herein.

Conventional sprinklers typically provide for throttling of between 25%-30% of range using a nozzle housing retention and break-up screw. In such sprinklers, coefficients of uniformity are badly deteriorated by the break-up screw at reduced ranges and provide no flow rate adjustment. That is, the use of the break-up screw negatively affects uniformity of distribution and does not adjust flow commensurate with the change in distribution angle. These conventional sprinklers thus do not provide satisfactory results.

Accordingly, it is desirable to provide a sprinkler that avoids these and other problems.

SUMMARY

When an upstream flow control and throttling valve is housed in a rotating nozzle housing assembly of a gear driven sprinkler, for example, directly ahead of the nozzle housing's discharge nozzle, when the flow rate through the sprinkler is reduced, the range of coverage may also be reduced directly proportional to the flow rate reduction. However, a high nozzle discharge energy is maintained to provide an excellent precipitation fallout pattern even when throttled to distances of less than 15 feet and with high efficiency of coverage and uniformity out to ranges of 46 feet for the same sprinkler with the same nozzle installed.

It is an object of the present disclosure to provide a sprinkler, or nozzle housing assembly for use in a sprinkler, that provides a 30% range reduction, for example, with an accompanying 30% water flow rate reduction such that water savings of 30% may be realized. That is, the nozzle housing assembly allows for a range reduction and a corresponding reduction in flow while maintaining uniform coverage. The sprinkler is preferably also configured to allow for quick and easy set-up from the top of the nozzle housing including setting a desired range and arc of coverage.

A nozzle housing assembly in accordance with an embodiment of the present disclosure includes a flow path in fluid communication with an inlet, the flow path including a main portion extending along a central axis of the nozzle housing and an angled portion, angled relative to the main portion, and defining an outlet passage through which fluid flows to exit the nozzle housing assembly, a nozzle mounted in the outlet passage for distributing fluid from the nozzle housing assembly, and a valve element mounted at a junction between the main portion and the angled portion of the flow path. The valve element is movable into and out of the flow path directly upstream of the nozzle such that a discharge velocity of fluid is directed toward the nozzle to provide a high flow entry velocity to the nozzle.

An irrigation sprinkler in accordance with an embodiment of the present disclosure includes a body with an inlet configured for connection to a water source, a riser movably mounted in the body and in fluid communication with the water source, a driving mechanism mounted in the riser; and a nozzle housing assembly mounted on the riser and mechanically connected to the driving mechanism such that the driving mechanism rotates the nozzle housing assembly in a desired arc of coverage. The nozzle housing assembly includes a flow path in fluid communication with the riser, the flow path including a main portion extending along a central axis of the nozzle housing and an angled portion, angled relative to the main portion, and defining an outlet passage through which water flows to exit the nozzle housing assembly and the irrigation sprinkler; a nozzle mounted in the outlet passage for distributing water from the nozzle housing assembly; and a valve element mounted at a junction between the main portion and the angled portion of the flow path. The valve element movable into and out of the flow path directly upstream of the nozzle such that a discharge velocity of water is directed toward the nozzle to provide a high flow entry velocity to the nozzle.

DETAILED DESCRIPTION OF THE EMBODIMENTS

Figure 1:
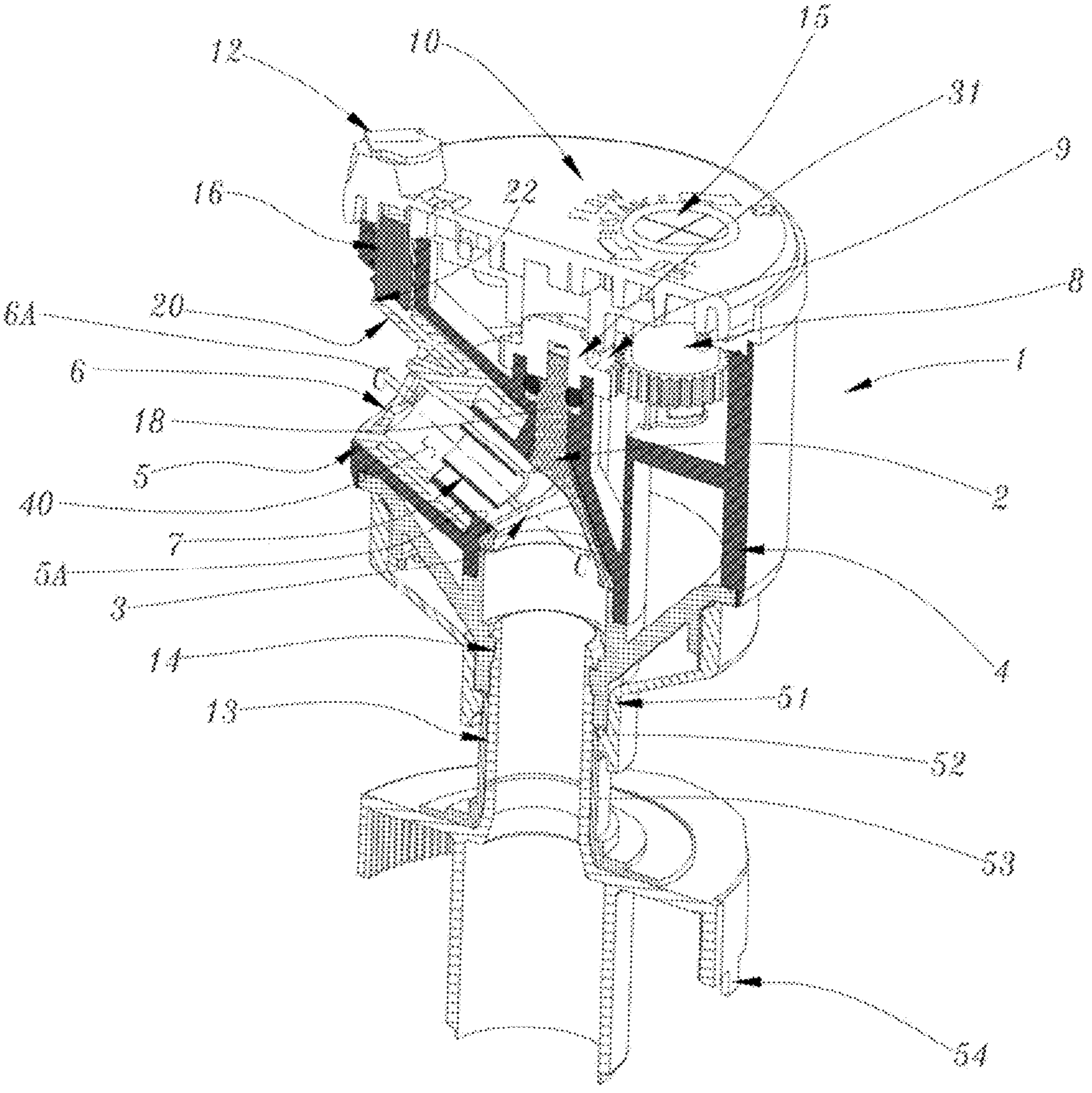
FIG. 1 shows a perspective cross-sectional view of a rotary driven sprinkler nozzle housing assembly with a flow throttling valve positioned in the nozzle housing at the intersection of the central axial flow path and the angled nozzle housing exit passage to the sprinkler discharge nozzle, including an extended concentric cylindrical flow straightening element immediately downstream of the flow throttling valve and directly in the entry area of the discharge nozzle.

FIG. 1 shows a preferred embodiment of a rotationally driven nozzle housing assembly 1. In FIG. 1, a flow and distance setting shaft 8 is shown as accessible from the top portion 10 of the nozzle housing assembly 1 at 15. That is, using the access 15 provided on the top of the assembly 10, the user may adjust the range and flow of the output stream of water from the nozzle housing assembly 1. This is useful since it allows for adjustments of the sprinkler even after installation in the ground without having to extent the nozzle housing assembly 1 out of the ground.

The throttling valve member 2 is shown in FIG. 1 with a valving opening 3 aligned to discharge water directly into the nozzle housing exit passage 5 of the nozzle housing 1. In a preferred embodiment, the nozzle 2 is positioned at the intersection of the central axial flow path C-C of the nozzle housing assembly 1 and the angled portion of the flow path that forms the nozzle housing exit passage 5. The discharge nozzle 6 is mounted in the nozzle housing exit passage 5. The nozzle housing exit passage 5 also includes concentric cylindrical flow straightening element 7. Water flowing out of the valving opening 3 flows into the nozzle housing exit passage 5 through the concentric cylindrical flow straightening element 7 mounted therein to the discharge nozzle 6 and then out of the nozzle housing 1.

Figure 5:
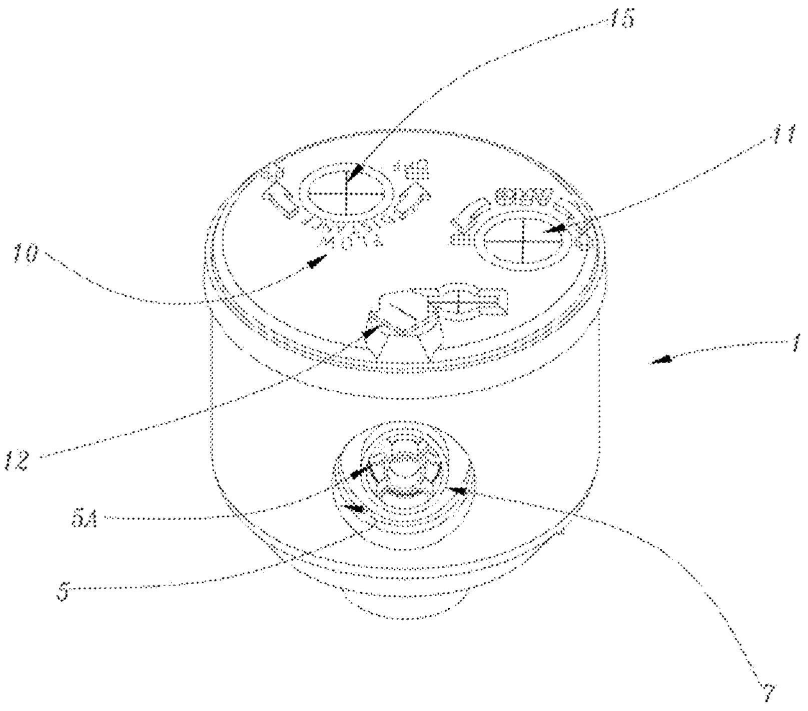
FIG. 5 is an exterior perspective view of the nozzle housing assembly looking into the nozzle housing exit passage with the discharge nozzle removed.
Figure 6:
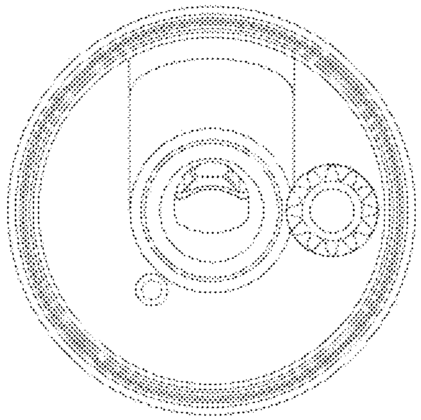
FIG. 6 is a bottom view of the nozzle housing assembly showing the interior of the flow throttling valve in the nozzle housing assembly.

In FIG. 5, the entire top portion 10 of the nozzle housing assembly 1 is shown from a view looking into the nozzle housing exit passage 5 with the discharge nozzle 6 removed.

Figure 11:
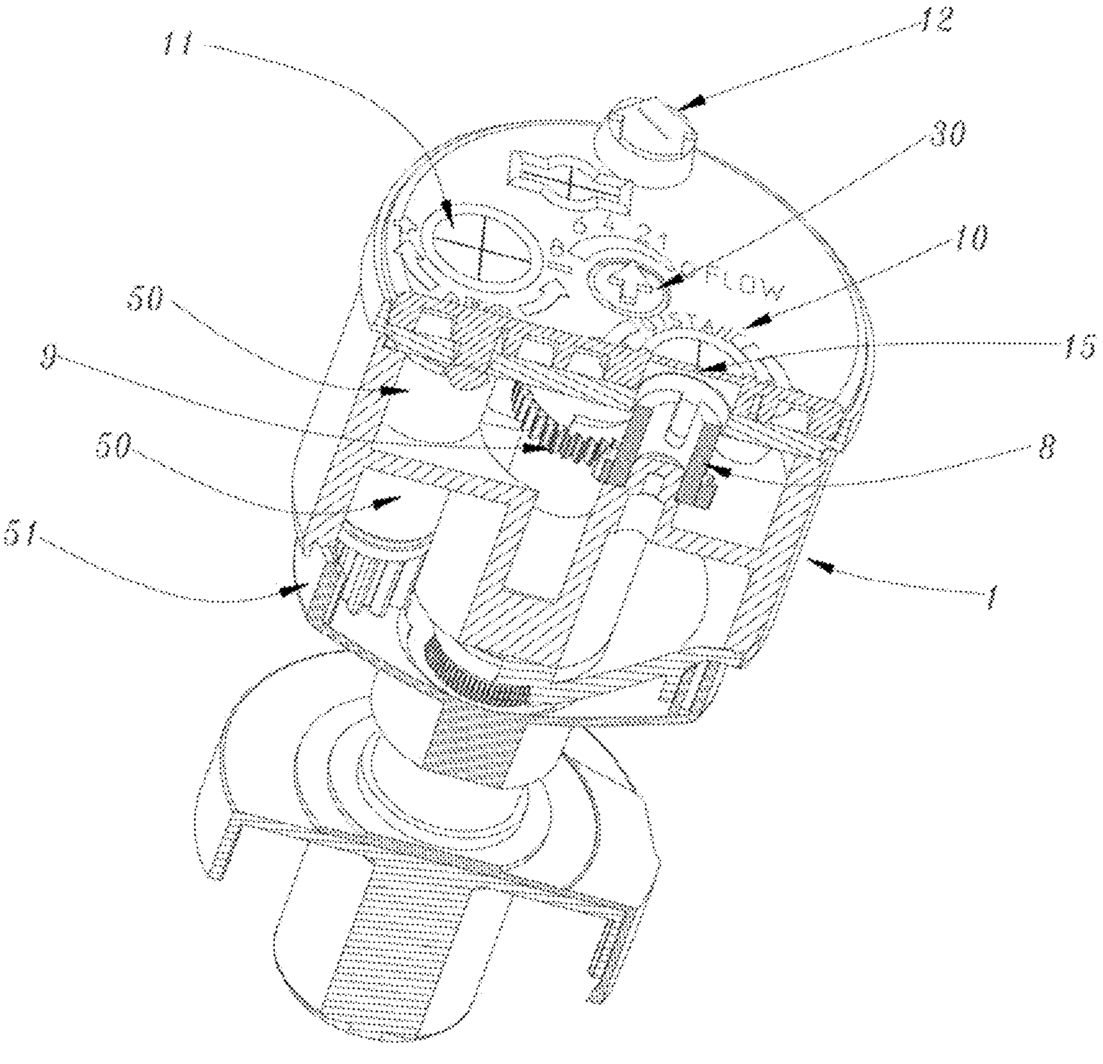
FIG. 11 shows a perspective cross-sectional view of the nozzle housing assembly including a mechanism to allow displaying the flow rate at a selected discharge nozzle size and pressure during throttling and selection of a desired coverage range.
Figure 12:
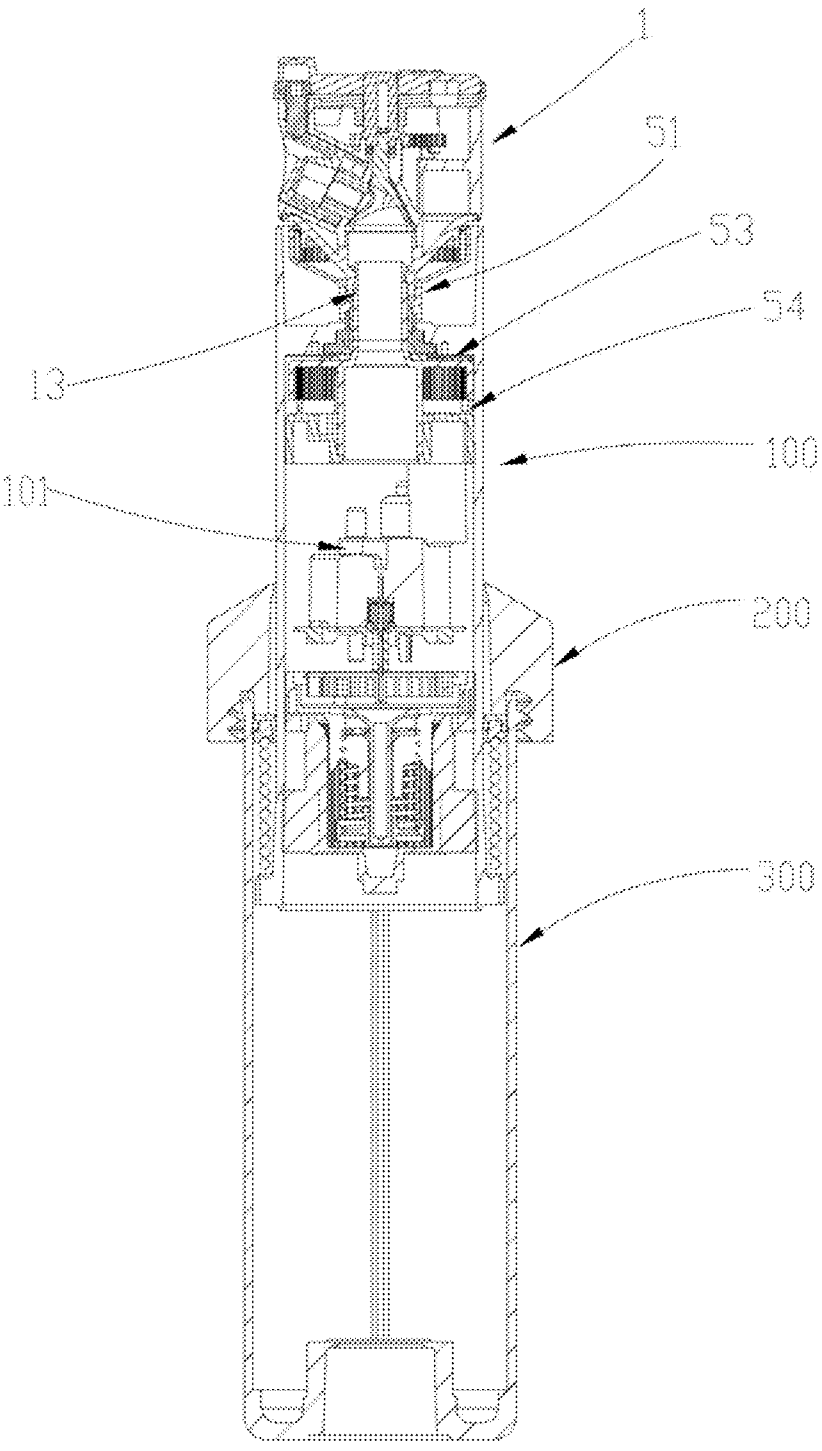
FIG. 12 illustrates a cross-sectional view of an exemplary pop up riser nozzle assembly gear driven sprinkler.

The nozzle housing assembly 1 allows for three adjustments to be made from the top of the assembly 1 at areas 11, 12 and 15. First, the arc of coverage around the sprinkler is settable by a geared arc setting shaft 50 that is accessible below the top surface 10 of the nozzle housing assembly 1 at 11 (See FIG. 11-12, for example). The shaft 50 is connected to gear 51 and concentric arc shaft 53 and the arc control member 54. Access to this shaft 50 is provided at 11, for example, as can be seen in FIGS. 5 and 11. The shaft 50 allows for adjustment and setting of the rotational reversing position of a water driven gear driving mechanism housed in a riser onto which nozzle assembly 1 is attached, typically by being snapped onto a geared drive shaft 13 at 14 (See FIGS. 1-2, for example) that protrudes from the riser of the sprinkler (See FIG. 12, for example). Typically, a riser 100 is mounted in a body 300 with a top 200 and extends upward under water pressure provided by a supply of water. The water pressure also drives the driving mechanism 101, which in turn rotates the nozzle housing assembly 1, which is typically mounted on the riser 100 as can be seen in FIG. 12, for example.

Flow distance adjustment may be provided and adjusted from the outside top surface 10 of the nozzle housing assembly 1 as indicated at 15 in FIG. 1. Flow distance adjustment may be made via the access 15 provided to the flow control valve shaft 8 which is geared for connection a gear 9, attached to the upper extending shaft 18 of the flow throttling valve 2, which is housed within the nozzle housing assembly 1 as shown in FIGS. 1-4.

Figure 2:
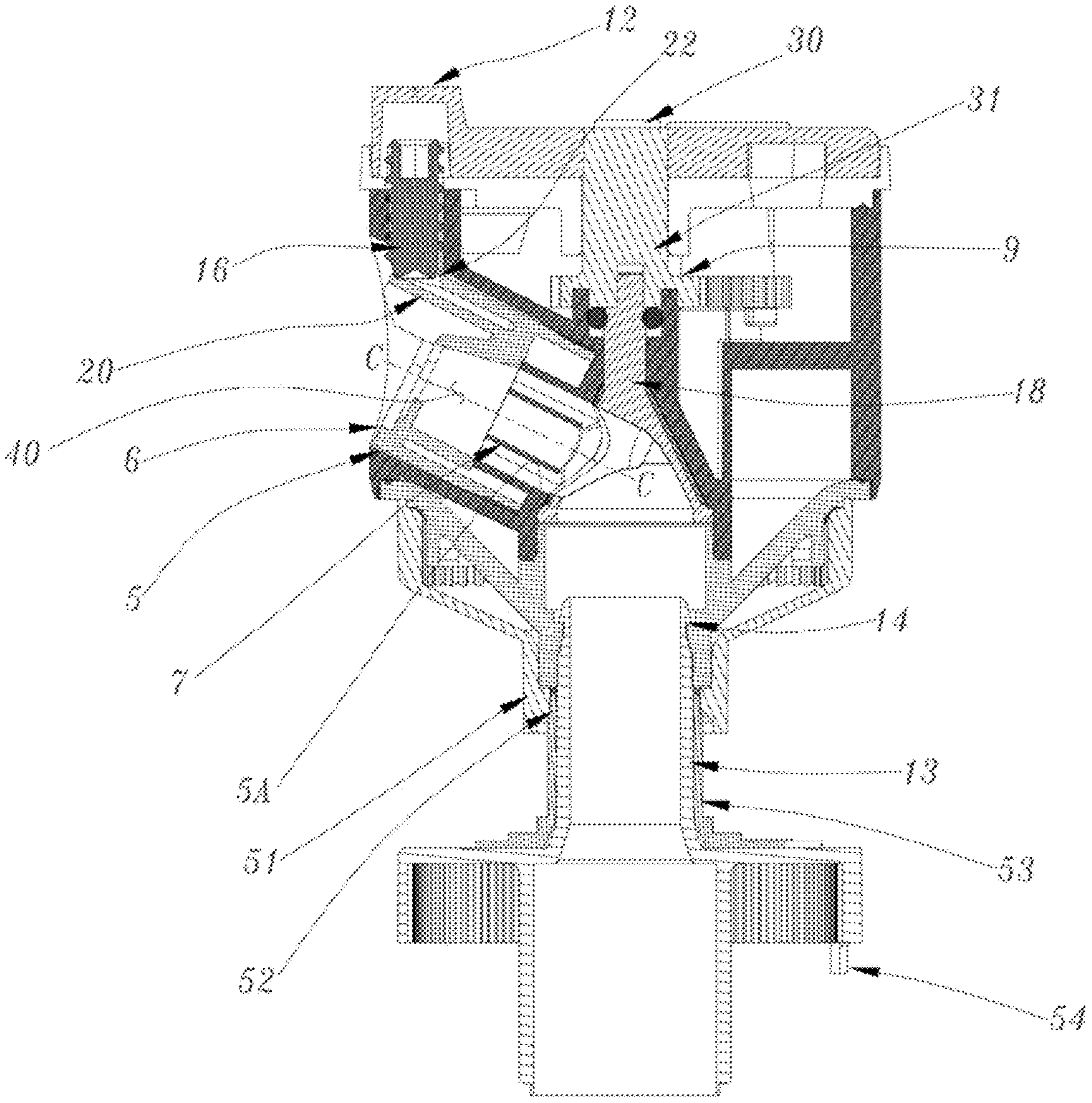
FIG. 2 shows a direct cross-sectional view of the nozzle housing of FIG. 1 including the flow throttling valve, flow straightening element and the discharge nozzle with a stream discharge elevation angle adjusting member and a flow throttling valve shaft extending to a top of the nozzle housing assembly.
Figure 4:
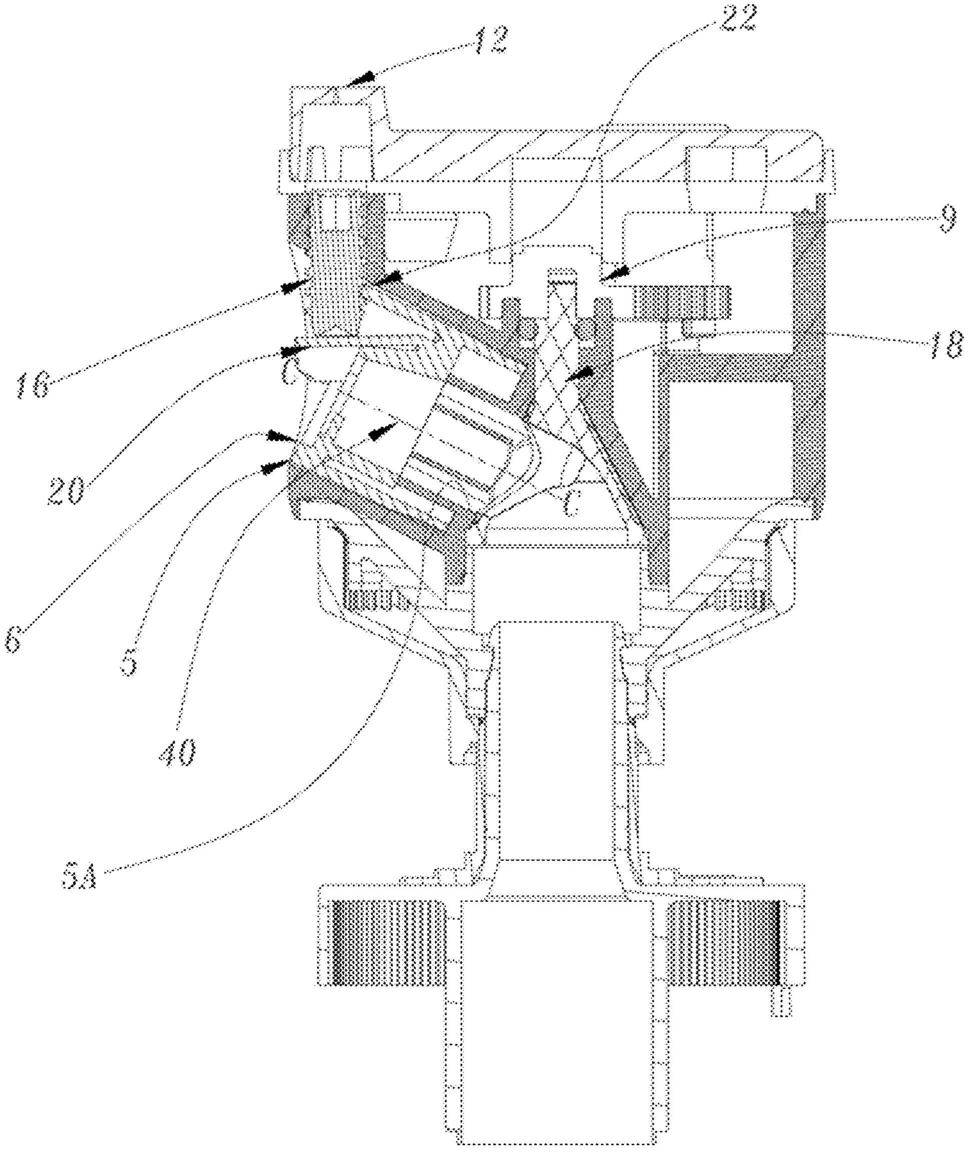
FIG. 4 is the same cross-sectional view of FIG. 2 with the stream discharge elevation angle adjusting member adjusted for the lowest discharge elevation angle, which is set by the nozzle retention and stream elevation setting screw.

The third adjustment on the top 10 of the nozzle housing assembly 1 is the exit elevation angle. The exit adjustment angle may be adjusted through the access hole 12 that allows for access to turn the nozzle retention and stream elevation angle adjustment screw 16. The screw 16 as shown in FIGS. 1, 2, and 4, may be backed out and upward out of the nozzle housing assembly 1 exit passage 5 to allow the discharge nozzle 6 to be inserted or removed from the passage 5 of the nozzle housing assembly 1.

The screw 16 may also be turned to extend down deeper into the exit passage 5 against the stream discharge elevation angle adjusting member 20. The stream discharge elevation angle adjusting member 20 may be molded as part of the discharge nozzle 6, as shown in FIGS. 1, 2, 4, 8, and 9. In another embodiment, the adjusting member 20 may be a separate element of the nozzle 6. Movement of the adjustment element 20 into the exit passage 5 lowers the elevation angle of water leaving the nozzle 6.

Another feature available on the nozzle assembly 1, as shown in FIG. 11, for example, is the ability to display the flow rate for a selected nozzle size and supply pressure as shown at 30. In the alternative, this may be used to show distance at the normal discharge stream elevation angle of the nozzle. That is, indicia may be provided on the top surface 10 of the nozzle housing assembly 1 and calibrated to the flow control valve shaft 8 to indicate the flow rate that is selected, and/or the range that will be achieved at the selected flow rate, for a normal discharge stream elevation angle.

The arc set shaft 50 is clearly shown in FIG. 11. The distance and flow rate setting shaft 8 is also visible in this figure. The flow rate display shaft 30 is an extension of shaft 31, which is shown in FIG. 1, of the flow control gear 9. The gear 9 is operatively coupled to the shaft 18 extending from the top of the valve member 2.

In a preferred configuration of the nozzle housing exit passage 5, the concentric cylindrical flow straightening element 7 is mounted downstream from the discharge out of the valving opening 3 of the flow throttling valve 2. In a preferred embodiment, the ratio of the length of the flow straightening element 7 passage, to width of the passage is 1.5 to 2, as shown in FIGS. 1, 2, 4, 5, and 7, for example.

A short plenum space 40 is preferably provided just upstream of the nozzle exit orifice 6A (See FIG. 1, for example) and allows the flow from the flow throttling valve 2 through the flow straightening element 7 to adjust relatively uniformly over the nozzle discharge orifice 6A.

Figure 3A:
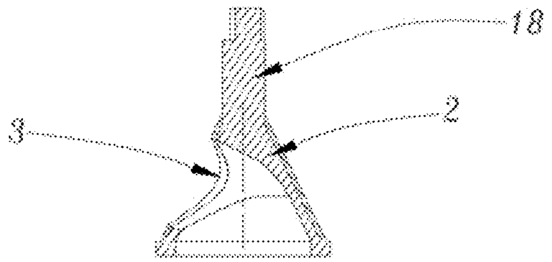
FIG. 3A is a cross-sectional view of the cone shaped flow throttling valve of FIGS. 1-2 removed from the housing.
Figure 3B:
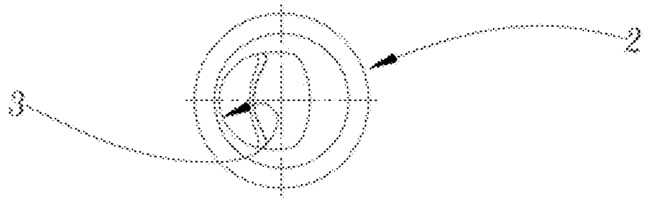
FIG. 3B is a bottom view of the flow throttling valve of FIGS. 1-3A.

An exemplary flow throttling valve 2 is shown in FIG. 3A and FIG. 3B. In this configuration, the flow throttling valve 2 includes the operating shaft 18 extending out of the apex of the generally cone shaped valve 2 for connection to the operating gear 9 (See FIGS. 1 and 4, for example). The side valving opening 3 is designed to be able to fully open to the exit passage 5 (See FIG. 1) in an open position to allow relatively unrestricted flow of water into the exit passage 5.

As the valve 2 rotates, via operation of the gear 9, for example, the opening 3 is moved out of alignment with the exit passage 5 to throttle the flow of water to the exit passage 5.

Figure 7:
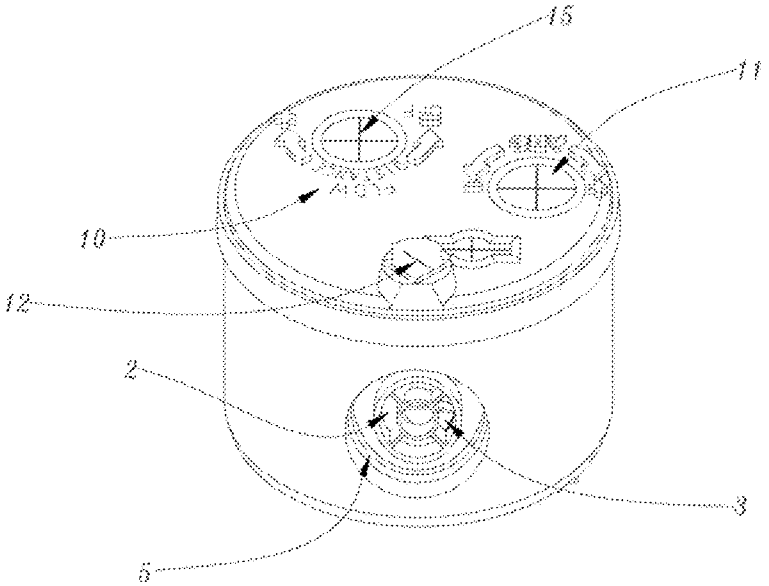
FIG. 7 is the same view as FIG. 5 with the interior flow throttling valve rotated clockwise to partially throttle the discharge flow to the concentric cylindrical flow straightening element and discharge nozzle which has been removed.
Figure 8:
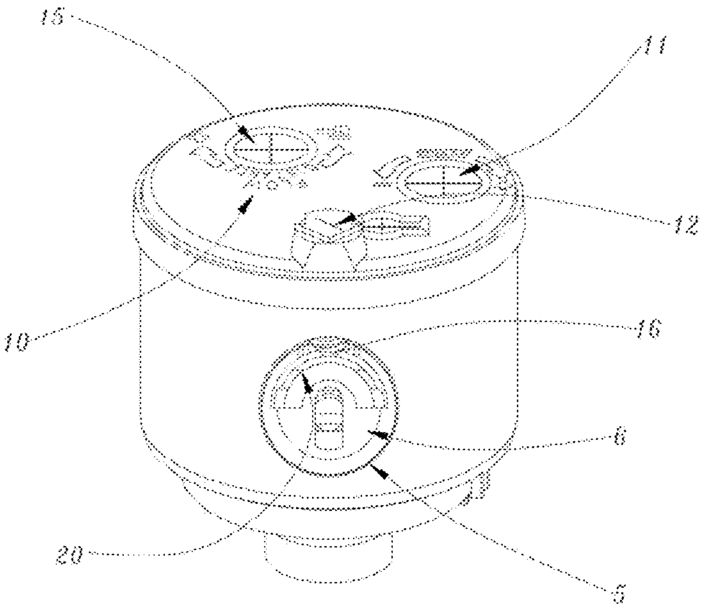
FIG. 8 is the same view as FIG. 7, but with the discharge nozzle shown in place in the exit passage and retained in the passage by the nozzle retention and stream elevation setting screw.
Figure 9:
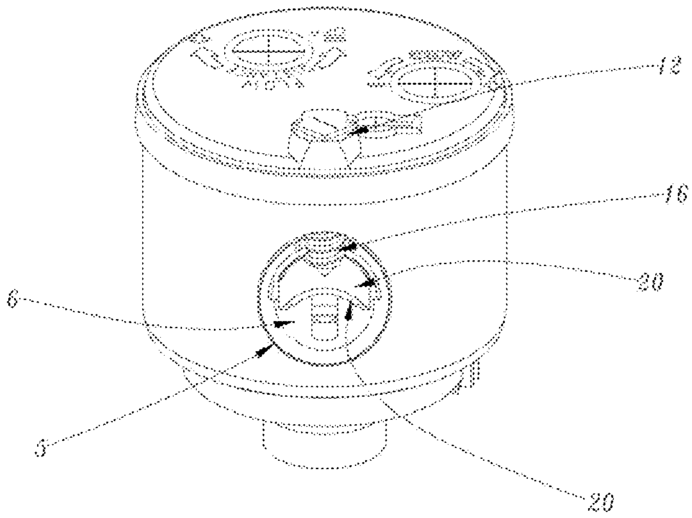
FIG. 9 is the same view as FIG. 8 but with the nozzle retention and stream elevation setting screw extending down into the exit flow passage to deflect the stream discharge elevation angle adjusting member.
Figure 10:
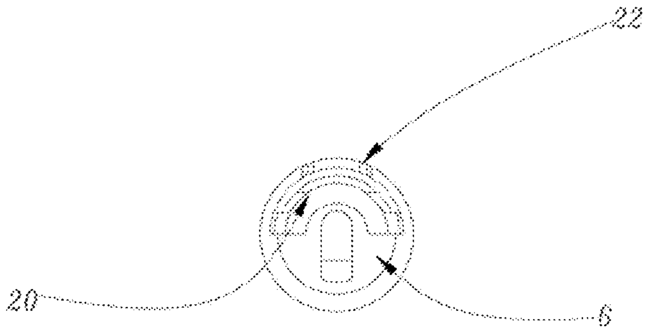
FIG. 10 is a direct front view of the discharge nozzle showing the cored out area to allow the stream discharge elevation angle adjusting member to move through its deflection angles.

Looking into the exit passage 5 with the discharge nozzle 6 removed as shown in FIG. 7, the concentric cylindrical flow straightening element 7 and the sides of the flow throttling valve 2 and its valving opening 3 are visible with the throttling valve 2 in a partially throttled position. The opening 3 may be rotated completely out of alignment with the exit passage 5 to a closed position to shut off the flow of water to the exit passage entirely.

The walls of the concentric cylindrical flow straightening element 7 direct the flow of water into the upstream plenum area 40 of the discharge nozzle 6 on line with the discharge orifice 6A aligned with a discharge axis C-C. As noted above, the plenum area 40 allows the water to spread uniformly as it approaches the discharge orifice 6A.

The nozzle housing assembly 1 of the present disclosure allows for adjustment of the arc of coverage, flow rate and throttling and elevation angle all from the top of the nozzle assembly. A flow control and throttling valve is provided in the nozzle housing assembly 1 at the intersection of the main flow path and the exit passage 5.

What is claimed is:

1. A nozzle housing assembly for a sprinkler comprises:

a flow path in fluid communication with an inlet, the flow path including a main portion extending along a central axis of the nozzle housing and an angled portion, angled relative to the main portion, and defining an outlet passage through which fluid flows to exit the nozzle housing assembly;

a nozzle mounted in the outlet passage for distributing fluid from the nozzle housing assembly; and a valve element mounted at a junction between the main portion and the angled portion of the flow path;

the valve element movable independent of the flow path into and out of the flow path directly upstream of the nozzle such that a discharge velocity of fluid is directed toward the nozzle to provide a high flow entry velocity to the nozzle.

2. The nozzle housing assembly of claim 1, further comprising a flow straightening element positioned in the outlet passage between the valve element and the nozzle.

3. The nozzle housing assembly of claim 2, wherein the flow straightening element is cylindrically shaped and concentric with a central axis of the outlet passage.

4. The nozzle housing assembly of claim 2, further comprising a plenum space provided immediately upstream of a nozzle discharge opening of the nozzle.

5. The nozzle housing assembly of claim 2, wherein the valve element is rotatable between an open position in which fluid flows substantially unobstructed into the angled portion of the flow path and a closed position in which fluid is prevented from flowing into the angled portion of the flow path.

6. The nozzle housing assembly of claim 5, wherein the valve element is movable to one or more positions between the open position and the closed position in which the flow of fluid to the angled portion of the flow path is restricted to provide flow throttling and range of coverage adjustment.

7. The nozzle housing assembly of claim 2, further comprising an adjustment member, mechanically connected to the valve element and accessible from outside of said nozzle housing assembly.

8. The nozzle housing assembly of claim 7, wherein the adjustment member is mechanically linked to the nozzle assembly and indicates a position of the valve member or a corresponding flow rate or distance.

9. The nozzle housing assembly of claim 7, wherein the adjustment member extends to a top surface of the nozzle housing assembly and is configured to move the valve element.

10. The nozzle housing assembly of claim 2, further comprising an arc set element accessible from outside the nozzle housing assembly to set a desired arc of coverage of the nozzle housing assembly.

11. The nozzle housing assembly of claim 1, further comprising an arc set element accessible from outside the nozzle housing assembly to set a desired arc of coverage of the nozzle housing assembly.

12. The nozzle housing assembly of claim 1 further comprising a stream deflection element movable downward by a nozzle housing retention screw to adjust a nozzle discharge stream elevation angle.

13. An irrigation sprinkler comprising:

a body with an inlet configured for connection to a water source;

a riser movably mounted in the body and in fluid communication with the water source; a driving mechanism mounted in the riser; and a nozzle housing assembly mounted on the riser and mechanically connected to the driving mechanism such that the driving mechanism rotates the nozzle housing assembly in a desired arc of coverage, wherein the nozzle housing assembly includes:

a flow path in fluid communication with the riser, the flow path including a main portion extending along a central axis of the nozzle housing and an angled portion, angled relative to the main portion, and defining an outlet passage through which water flows to exit the nozzle housing assembly and the irrigation sprinkler;

a nozzle mounted in the outlet passage for distributing water from the nozzle housing assembly; and a valve element mounted at a junction between the main portion and the angled portion of the flow path;

the valve element movable independent of the flow path into and out of the flow path directly upstream of the nozzle such that a discharge velocity of water is directed toward the nozzle to provide a high flow entry velocity to the nozzle.

14. The irrigation sprinkler of claim 13, wherein the nozzle housing assembly further comprises a flow straightening element positioned in the outlet passage between the valve element and the nozzle.

15. The irrigation sprinkler of claim 14, wherein the flow straightening element is cylindrically shaped and concentric with a central axis of the outlet passage.

16. The irrigation sprinkler of claim 14, wherein the nozzle further comprises a plenum space provided immediately upstream of a nozzle discharge opening of the nozzle.

17. The irrigation sprinkler of claim 14, wherein the valve element is rotatable between an open position in which water flows substantially unobstructed into the angled portion of the flow path and a closed position in which water is prevented from flowing into the angled portion of the flow path.

18. The irrigation sprinkler of claim 17, wherein the valve element is movable to one or more positions between the open position and the closed position in which the flow of water to the angled portion of the flow path is selectively restricted to provide flow throttling and range of coverage adjustment.

19. The irrigation sprinkler of claim 14, wherein the nozzle housing assembly further comprises an adjustment member, mechanically connected to the valve element and accessible from outside of said nozzle housing assembly.

20. The irrigation sprinkler of claim 19, wherein the adjustment member is mechanically linked to the valve element and indicates a position of the valve element or a corresponding flow rate or distance.

21. The irrigation sprinkler of claim 19, wherein the adjustment member extends to a top surface of the nozzle housing assembly and is configured to move the valve element.

22. The irrigation sprinkler of claim 14, further comprising an arc set element accessible from outside the nozzle housing assembly and connected to the driving mechanism to set the desired arc of coverage of the nozzle housing assembly.

23. The irrigation sprinkler of claim 13, further comprising an arc set element accessible from outside the nozzle housing assembly and connected to the driving mechanism to set the desired arc of coverage of the nozzle housing assembly.

24. The irrigation sprinkler of claim 13, further comprising a stream deflection element movable downward by a nozzle housing retention screw to adjust a nozzle discharge stream elevation angle.

* * * * *